(12) United States Patent
Kwak et al.

(10) Patent No.: US 10,623,169 B2
(45) Date of Patent: Apr. 14, 2020

(54) METHOD OF TRANSMITTING AND RECEIVING DOWNLINK DATA AND APPARATUS THEREFOR

(71) Applicant: LG Electronics Inc., Seoul (KR)

(72) Inventors: Kyuhwan Kwak, Seoul (KR); Seungmin Lee, Seoul (KR); Yunjung Yi, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/397,763

(22) Filed: Apr. 29, 2019

(65) Prior Publication Data

US 2019/0334689 A1  Oct. 31, 2019

Related U.S. Application Data

(60) Provisional application No. 62/670,063, filed on May 11, 2018, provisional application No. 62/663,293, filed on Apr. 27, 2018.

(51) Int. Cl.
*H04L 5/00* (2006.01)
*H04W 72/04* (2009.01)
*H04W 72/00* (2009.01)
*H04W 76/11* (2018.01)

(52) U.S. Cl.
CPC .......... *H04L 5/0082* (2013.01); *H04L 5/005* (2013.01); *H04W 72/005* (2013.01);
(Continued)

(58) Field of Classification Search
CPC ...... H04L 5/0082; H04L 5/005; H04W 76/11; H04W 72/005; H04W 72/042; H04W 72/0446
See application file for complete search history.

(56) References Cited

U.S. PATENT DOCUMENTS

2010/0226327 A1* 9/2010 Zhang ................. H04B 7/0632
370/329
2014/0334400 A1* 11/2014 Chen .................... H04L 5/0048
370/329
(Continued)

FOREIGN PATENT DOCUMENTS

WO  WO-2010135911 A1 * 12/2010 ............ H04W 72/04
WO  WO2015048830        4/2015
WO  WO-2016182052 A1 * 11/2016 ............ H04W 28/06

OTHER PUBLICATIONS

Huawei, HiSilicon, "Compact DCI for LTE URLLC," R1-1801873, 3GPP TSG RAN WG1 Meeting #92, Athens, Greece, Feb. 26-Mar. 2, 2018, 9 pages.
(Continued)

*Primary Examiner* — Kashif Siddiqui
(74) *Attorney, Agent, or Firm* — Fish & Richardson P.C.

(57) ABSTRACT

A method of receiving Downlink (DL) data by a User Equipment (UE) in a wireless communication system. The method includes: receiving information related to a number of repetitions of the DL data which is repeatedly transmitted in (i) at least one first Transmission Time Interval (TTI) included in a first subframe, and in (ii) at least one second TTI included in a second subframe that is after the first subframe; and receiving the DL data based on the number of repetitions of the DL data. If a Transmission Mode (TM) for the first subframe is different from a TM for the second subframe, then the UE does not receive the DL data in the at least one second TTI.

15 Claims, 15 Drawing Sheets

(52) U.S. Cl.
CPC ..... *H04W 72/042* (2013.01); *H04W 72/0446* (2013.01); *H04W 76/11* (2018.02)

(56) References Cited

U.S. PATENT DOCUMENTS

2017/0134124 A1* 5/2017 Lee .................. H04L 1/1812
2018/0076924 A1 3/2018 Lee et al.
2018/0317098 A1* 11/2018 Choi ................. H04L 25/023

OTHER PUBLICATIONS

Ericsson, "Remaining details on DL data channel design," R1-1720526, 3GPP TSG-RAN WG1 Meeting #91, Reno, USA, Nov. 27th-Dec. 1st, 2017, 12 pages.

Qualcomm Incorporated, "Remaining details of DL data channel design," R1-1720396, 3GPP TSG RAN WG1 #91, Reno, Nevada, U.S.A., Nov. 27-Dec. 1st, 2017, 10 pages.

ZTE, Sanechips, "Discussion on PDSCH repetition for LTE URLLC," R1-1803962, 3GPP TSG RAN WG1 Meeting #92bis, Sanya, China, Apr. 16-20, 2018.

Motorola Mobility, "Introduction of enhancements for high capacity stationary wireless link and introduction of 1024 QAM for LTE to 36.213," R1-1804478, 3GPP TSG RAN WG1 Meeting #92bis, Sanya, P.R. China, Apr. 16-20, 2018, 117 pages.

Qualcomm Incorporated, "Downlink Enhancements for URLLC," R1-1805271, 3GPP TSG RAN WG1 #92b, Sanya, P. China, Apr. 16-20, 2018, 5 pages.

Taiwan Office Action in Taiwan Application No. 108114957, dated Jan. 17, 2020, 14 pages. (with English translation).

* cited by examiner

CONTROL-PLANE PROTOCOL STACK

USER-PLANE PROTOCOL STACK

1 TX or 2 TX

4 TX

METHOD OF TRANSMITTING AND RECEIVING DOWNLINK DATA AND APPARATUS THEREFOR

CROSS-REFERENCE TO RELATED APPLICATIONS

This application claims the benefit of an earlier filing date and right of priority to U.S. Provisional Application No. 62/663,293, filed on Apr. 27, 2018, and U.S. Provisional Application No. 62/670,063, filed on May 11, 2018. The disclosures of the prior applications are incorporated by reference in their entirety.

TECHNICAL FIELD

The present disclosure generally relates to transmitting and receiving downlink data in a wireless communication system.

BACKGROUND

As wireless communication technology faces increasing demands and expectation of users and service providers, new technological evolution is being developed to achieve future competitiveness. Specifically, techniques are being developed to achieve cost reduction per bit, increased service availability, flexible use of frequency bands, a simplified structure, an open interface, and appropriate power consumption.

SUMMARY

Systems and techniques are disclosed herein that are related to transmitting and receiving a downlink data channel.

One general aspect of the present disclosure includes a method of receiving downlink (DL) data by a user equipment (UE) in a wireless communication system, the method including: receiving information related to a number of repetitions of the DL data which is repeatedly transmitted in (i) at least one first transmission time interval (TTI) included in a first subframe, and in (ii) at least one second TTI included in a second subframe that is after the first subframe; and receiving the DL data based on the number of repetitions of the DL data, where, based on a transmission mode (TM) for the first subframe being different from a TM for the second subframe, the DL data is not received in the at least one second TTI. Other embodiments of this aspect include corresponding computer systems, apparatus, and computer programs recorded on one or more computer storage devices, each configured to perform the actions of the methods.

Implementations may include one or more of the following features. The method where the first subframe and the second subframe are consecutive in time. The method where the number of repetitions of the DL data exceeds 1. The method where any one of the first subframe and the second subframe is a multicast broadcast single frequency network (MBSFN) subframe. The method may also include where the other one of the first subframe and the second subframe is a non-MBSFN subframe. The method where a common reference signal (CRS)-based TM is configured for any one of the first subframe and the second subframe. The method may also include where a demodulation reference signal (DMRS)-based TM is configured for the other one of the first subframe and the second subframe. The method where the information related to the number of repetitions of the DL data is included in cell-radio network temporary identifier (C-RNTI)-based downlink control information (DCI). The method where the at least one first TTI and the at least one second TTI are short TTIs. Implementations of the described techniques may include hardware, a method or process, or computer software on a computer-accessible medium.

Another general aspect includes an apparatus including: at least one processor; and at least one computer memory operably connectable to the at least one processor and storing instructions that, when executed by the at least one processor, perform operations including: receiving information related to a number of repetitions of downlink (DL) data which is repeatedly transmitted in (i) at least one first transmission time interval (TTI) included in a first subframe, and in (ii) at least one second TTI included in a second subframe that is located after the first subframe, and receiving the DL data based on the number of repetitions of the DL data, where, based on a transmission mode (TM) for the first subframe being different from a TM for the second subframe, the DL data is not received in the at least one second TTI. Other embodiments of this aspect include corresponding computer systems, apparatus, and computer programs recorded on one or more computer storage devices, each configured to perform the actions of the methods.

Implementations may include one or more of the following features. The apparatus where the first subframe and the second subframe are consecutive in time. The apparatus where the number of repetitions of the DL data exceeds 1. The apparatus where any one of the first subframe and the second subframe is a multicast broadcast single frequency network (MBSFN) subframe. The apparatus may also include where the other one of the first subframe and the second subframe is a non-MBSFN subframe. The apparatus where a common reference signal (CRS)-based TM is configured for any one of the first subframe and the second subframe. The apparatus may also include where a demodulation reference signal (DMRS)-based TM is configured for the other one of the first subframe and the second subframe. The apparatus where the information related to the number of repetitions of the DL data is included in cell-radio network temporary identifier (C-RNTI)-based downlink control information (DCI). The apparatus where the at least one first TTI and the at least one second TTI are short TTIs. Implementations of the described techniques may include hardware, a method or process, or computer software on a computer-accessible medium.

Another general aspect includes a method of transmitting downlink (DL) data by a base station (BS) in a wireless communication system, the method including: transmitting information related to a number of repetitions of the DL data which is repeatedly transmitted in (i) at least one first transmission time interval (TTI) included in a first subframe, and in (ii) at least one second TTI included in a second subframe that is located after the first subframe; and transmitting the DL data based on the number of repetitions of the DL data, where, based on a transmission mode (TM) for the first subframe being different from a TM for the second subframe, the DL data is not transmitted in the at least one second TTI. Other embodiments of this aspect include corresponding computer systems, apparatus, and computer programs recorded on one or more computer storage devices, each configured to perform the actions of the methods.

Another general aspect includes a user equipment (UE) configured to receive downlink (DL) data in a wireless communication system, the UE including: at least one transceiver; at least one processor; and at least one computer memory operably connectable to the at least one processor and storing instructions that, when executed by the at least one processor, perform operations including: receiving, through the at least one transceiver, information related to a number of repetitions of the DL data which is repeatedly transmitted in (i) at least one first transmission time interval (TTI) included in a first subframe, and in (ii) at least one second TTI included in a second subframe that is located after the first subframe; and receiving, through the at least one transceiver, the DL data based on the number of repetitions of the DL data, where, based on a transmission mode (TM) for the first subframe being different from a TM for the second subframe, the DL data is not received in the at least one second TTI. Other embodiments of this aspect include corresponding computer systems, apparatus, and computer programs recorded on one or more computer storage devices, each configured to perform the actions of the methods.

Another general aspect includes a base station (BS) configured to transmit downlink (DL) data in a wireless communication system, the BS including: at least one transceiver; at least one processor; and at least one computer memory operably connectable to the at least one processor and storing instructions that, when executed by the at least one processor, perform operations including: transmitting, through the at least one transceiver, information related to a number of repetitions of the DL data which is repeatedly transmitted in (i) at least one first transmission time interval (TTI) included in a first subframe, and in (ii) at least one second TTI included in a second subframe that is located after the first subframe; and transmitting, through the at least one transceiver, the DL data based on the number of repetitions of the DL data, where, based on a transmission mode (TM) for the first subframe being different from a TM for the second subframe, the DL data is not transmitted in the at least one second TTI. The base station also includes Other embodiments of this aspect include corresponding computer systems, apparatus, and computer programs recorded on one or more computer storage devices, each configured to perform the actions of the methods.

It is to be understood that both the foregoing general description and the following detailed description of the present disclosure are exemplary and explanatory and are intended to provide further explanation of the disclosure as claimed.

DETAILED DESCRIPTION

Figure 1:
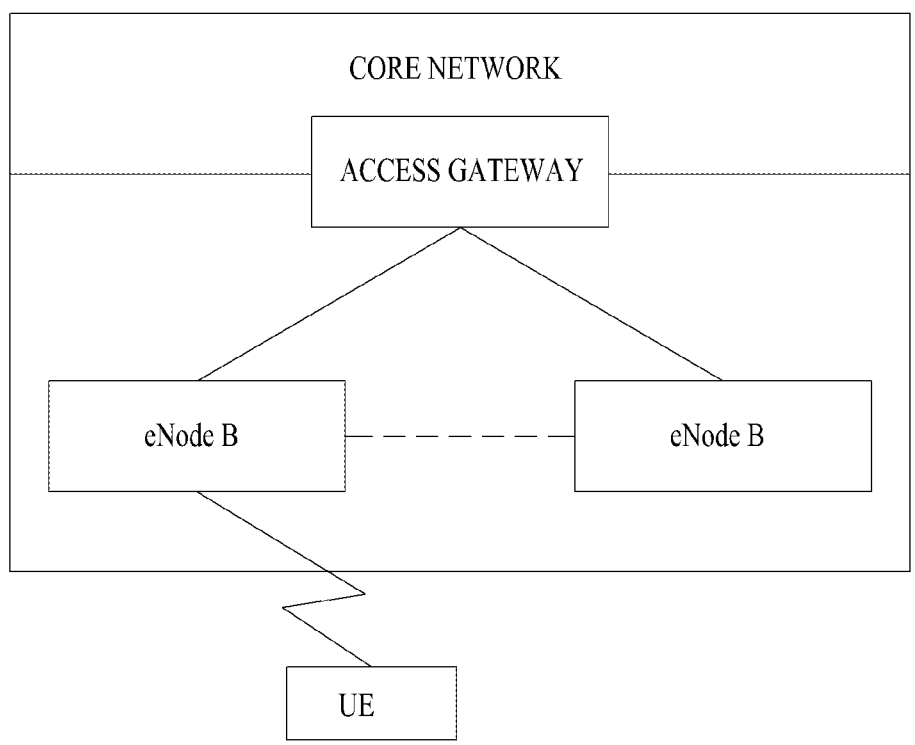
FIG. 1 illustrates an example of a wireless communication system.

Implementations are disclosed herein that enable transmitting and receiving downlink data, and more particularly, transmitting and receiving repeatedly-transmitted data in consecutive subframes in scenarios where the consecutive subframes are configured as different subframe types and/or different transmission modes (TMs).

As an example, in some scenarios, repeated transmissions of data may be scheduled so as to span over multiple subframes of different types and/or different TMs. In such scenarios, a problem may arise if a Reference Signal (RS) is present in one subframe, but is not present in another subframe in which the data subsequently repeated. Compounding this problem, the two subframes may have different types and/or different TMs. In such scenarios, the UE may fail to perform decoding for the one or more of the repeated transmissions of data in subsequent subframes having different types and/or different TMs.

Implementations disclosed herein address such problems. According to some implementations, a User Equipment (UE) receives information related to a number of repetitions of the DL data which is repeatedly transmitted in (i) at least one first Transmission Time Interval (TTI) included in a first subframe, and in (ii) at least one second TTI included in a second subframe that is after the first subframe. The UE then receives the DL data based on the number of repetitions of the DL data. If a Transmission Mode (TM) for the first subframe is different from a TM for the second subframe, then the UE does not receive the DL data in the at least one second TTI.

According to implementations of the present disclosure, data which is repeatedly transmitted in subframes that are configured as different subframe types and/or different TMs can be efficiently transmitted and received.

Reference will now be made in detail to various implementations of the present disclosure, examples of which are illustrated in the accompanying drawings. Wherever possible, the same reference numbers will be used throughout the drawings to refer to the same or like parts.

The configuration, operation, and other features of the present disclosure will readily be understood with implementations of the present disclosure described with reference to the attached drawings. Embodiments of the present disclosure as set forth herein are examples in which the technical features of the present disclosure are applied to a 3rd Generation Partnership Project (3GPP) system.

While implementations of the present disclosure are described in the context of Long Term Evolution (LTE) and LTE-Advanced (LTE-A) systems, they are purely exemplary. Therefore, the implementations of the present disclosure are applicable to any other communication system as long as the above definitions are valid for the communication system. In addition, while implementations of the present disclosure are described in the context of Frequency Division Duplexing (FDD), they are also readily applicable to Half-FDD (H-FDD) or Time Division Duplexing (TDD) with some modifications.

A brief description will be given of a 3rd Generation Partnership Project Long Term Evolution (3GPP LTE) system as an example of a wireless communication system to which the present disclosure can be applied.

FIG. 1 illustrates an example of a configuration of a wireless communication system. In some scenarios, this example may be used to implement an Evolved Universal Mobile Telecommunications System (E-UMTS) network.

The E-UMTS system is an evolution of a UMTS system. E-UMTS is also referred to as an LTE system. Details of the technical specifications of UMTS and E-UMTS can be found in Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 MHz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc., by transmitting DL scheduling information to the UE. Regarding UL data, the eNB notifies a particular UE of a time-frequency area in which the UE can transmit data, a coding scheme, a data size, HARQ information, etc., by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

Figure 2A:
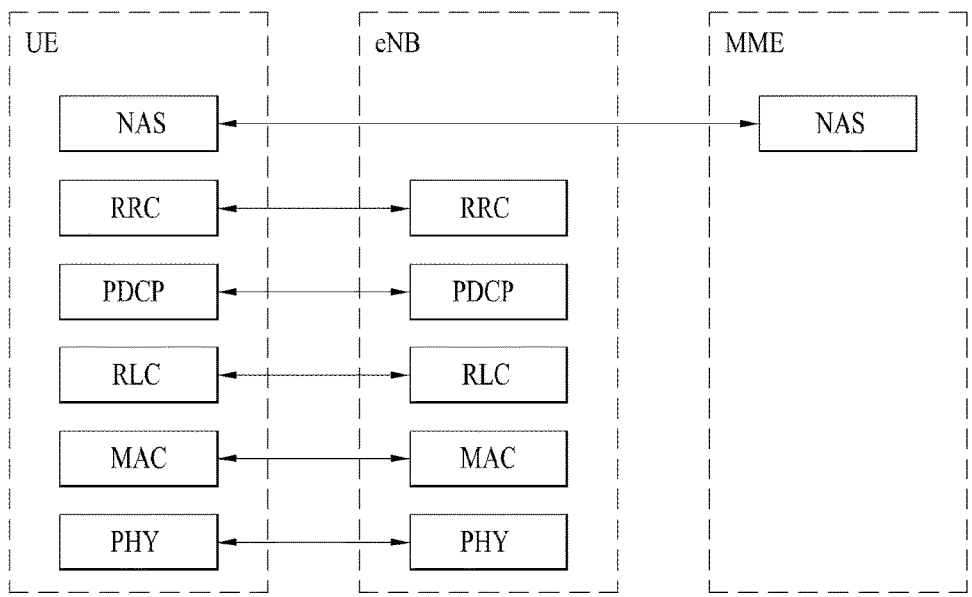
FIGS. 2A and 2B illustrates an example of a control-plane protocol stack and a user-plane protocol stack in a radio interface protocol architecture between a user equipment (UE) and a radio access network.
Figure 2B:
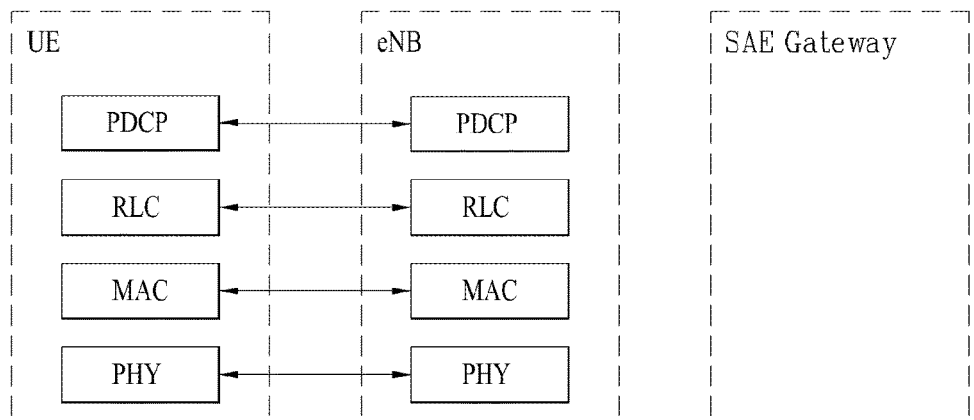

FIGS. 2A and 2B illustrates an example of control-plane and user-plane protocol stacks in a radio interface protocol architecture between a user equipment (UE) and a radio access network. In some scenarios, this example may conform to a 3GPP wireless access network standard between a UE and an Evolved UMTS Terrestrial Radio Access Network (E-UTRAN).

For example, the control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
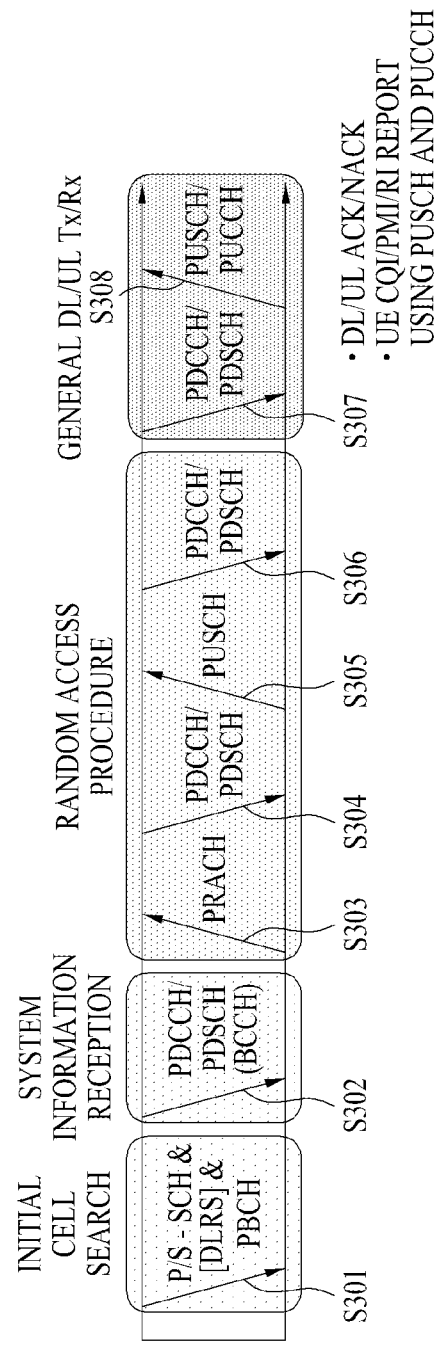
FIG. 3 illustrates an example of physical channels and signal transmission using the physical channels in a 3GPP system.

FIG. 3 illustrates examples of physical channels and transmitting signals on the physical channels in a 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
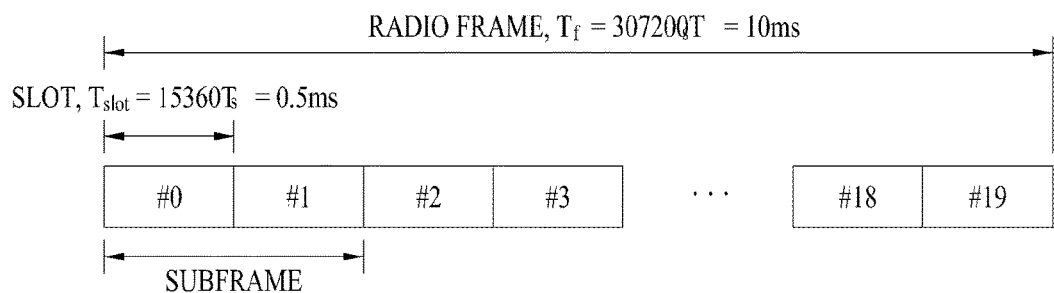
FIG. 4 illustrates an example of a structure of a radio frame.

FIG. 4 illustrates an example of a structure of a radio frame. In some scenarios, such implementations may be compatible with an LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is merely exemplary and thus the number of subframes in a radio frame, the number of slots in a subframe, or the number of OFDM symbols in a slot may vary.

Figure 5:
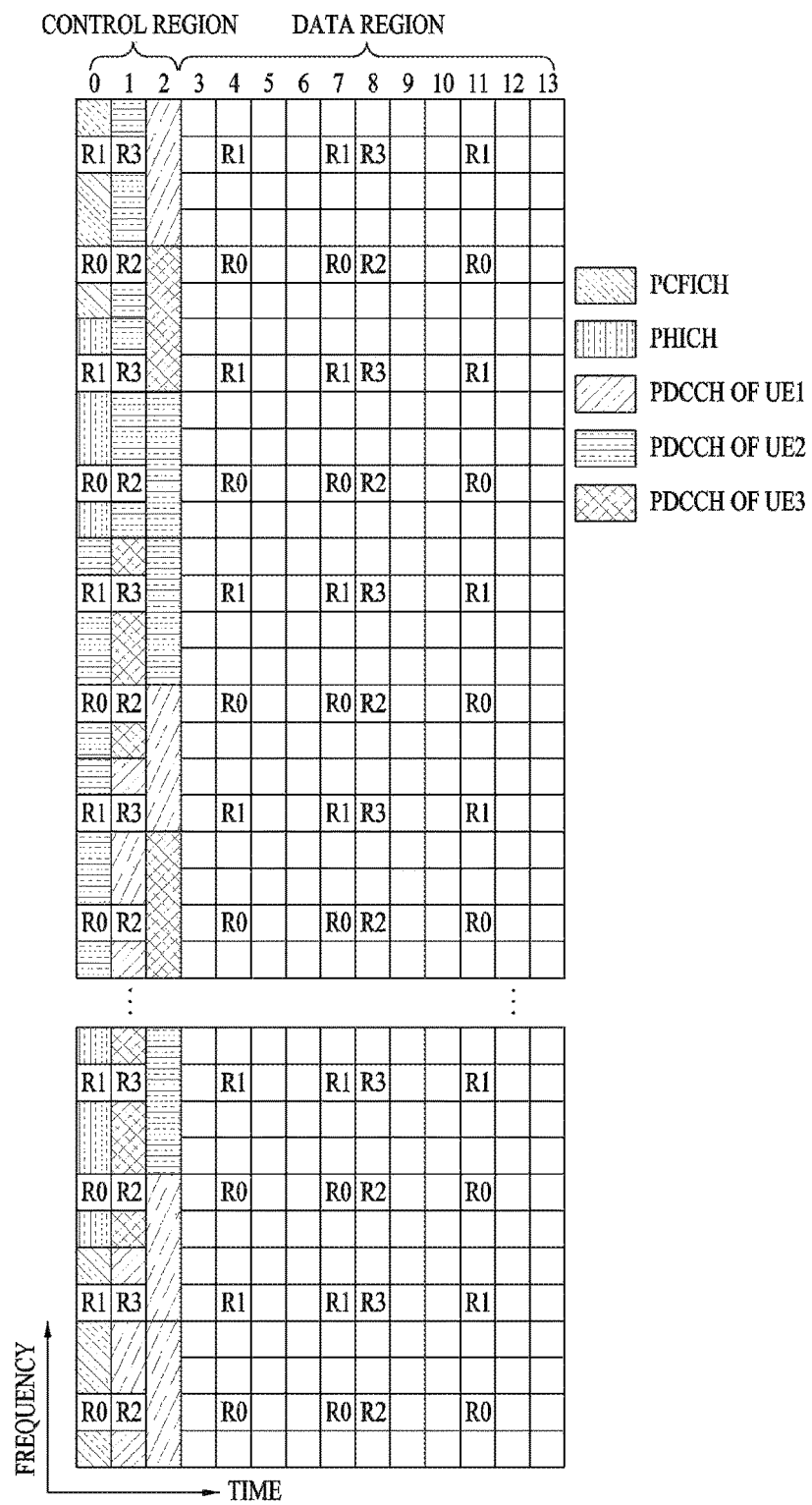
FIG. 5 illustrates an example of a structure of a downlink radio frame.

FIG. 5 illustrates examples of control channels included in a control region of a subframe in a DL radio frame. In some scenarios, such implementations may be compatible with an LTE system.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is an integer greater than or equal to 1, and is indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, in scenarios where the Cyclic Redundancy Check (CRC) of a specific PDCCH is masked by Radio Network Temporary Identity (RNTI) "A" and information about data transmitted in radio resources (e.g., at a frequency position) "B" based on transport format information (e.g., a transport block size, a modulation scheme, coding information, etc.) "C" is transmitted in a specific subframe, a UE within a cell monitors, e.g., blind-decodes, a PDCCH using its RNTI information in a search space. If one or more UEs have RNTI "A", then those UEs receive the PDCCH and receive a PDSCH indicated by "B" and "C" based on information of the received PDCCH.

Figure 6A:
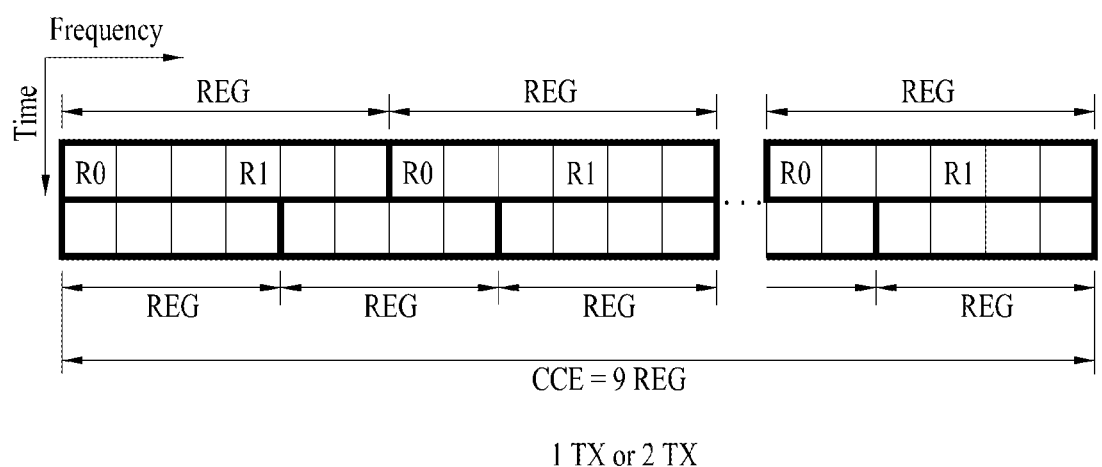
FIGS. 6A and 6B illustrates an example of resource units used to configure a downlink control channel.
Figure 6B:
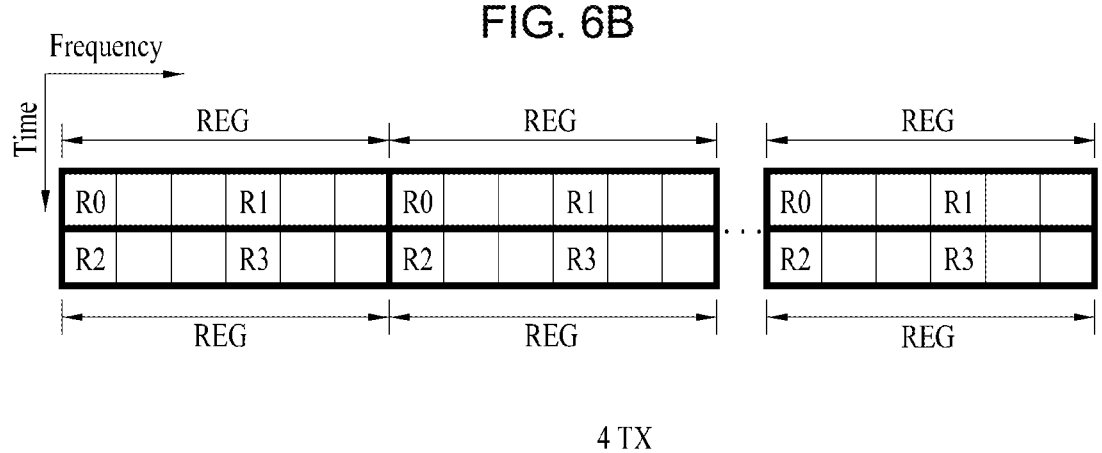

FIGS. 6A and 6B illustrates examples of resource units used to configure a downlink control channel. In some scenarios, such implementations may be compatible with an LTE system.

FIG. 6A shows a case in which the number of transmit (Tx) antennas is 1 or 2 and FIG. 6B shows a case in which the number of Tx antenna is 4. Although a different RS pattern is used according to the number of Tx antennas, REs are configured for a DL control channel in the same manner.

Referring to FIGS. 6A and 6B, a basic resource unit of a DL control channel is an REG. The REG includes four contiguous REs except for REs carrying RSs. REGs are delineated with bold lines in FIGS. 6A and 6B. A PCFICH and a PHICH include 4 REGs and 3 REGs, respectively. A PDCCH is configured in units of a control channel element (CCE), each CCE including 9 REGs.

To determine whether a PDCCH including L CCEs is transmitted to a UE, the UE is configured to monitor $M^{(L)}$ (≥L) CCEs that are arranged contiguously or according to a predetermined rule. The value of L that the UE should consider for PDCCH reception may be a plural value. The CCE sets that the UE should monitor to receive a PDCCH are referred to as a search space. As an example, a system that is compatible with LTE may define search spaces as illustrated in Table 1, below.

TABLE 1

| Type | Search space $S_k^{(L)}$ Aggregation level L | [Size in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

In the example of Table 1, the parameter L is a CCE aggregation level, that is, the number of CCEs in a PDCCH, the parameter $S_k^{(L)}$ is a search space with CCE aggregation level L, and the parameter $M^{(L)}$ is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency region of the control region of a subframe. As a control channel is configured in units of a CCE but interleaved in units of an REG, frequency diversity gain and interference randomization gain may be maximized.

Figure 7:
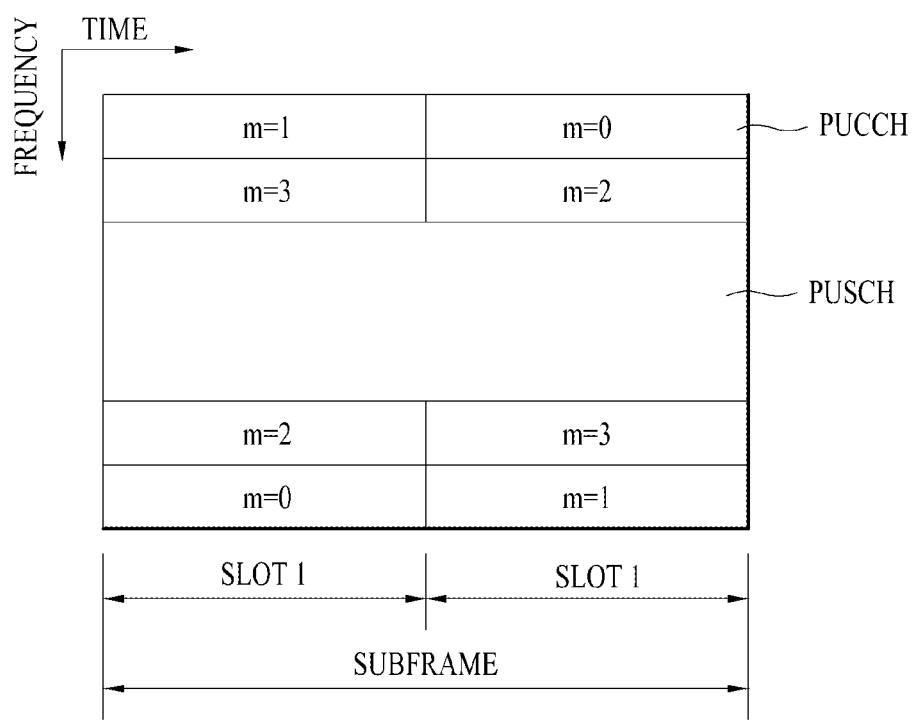
FIG. 7 illustrates an example of a structure of an uplink subframe.

FIG. 7 illustrates an example of a structure of a UL subframe. In some scenarios, such implementations may be compatible with an LTE system.

Referring to FIG. 7, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in the example of FIG. 7.

Figure 8:
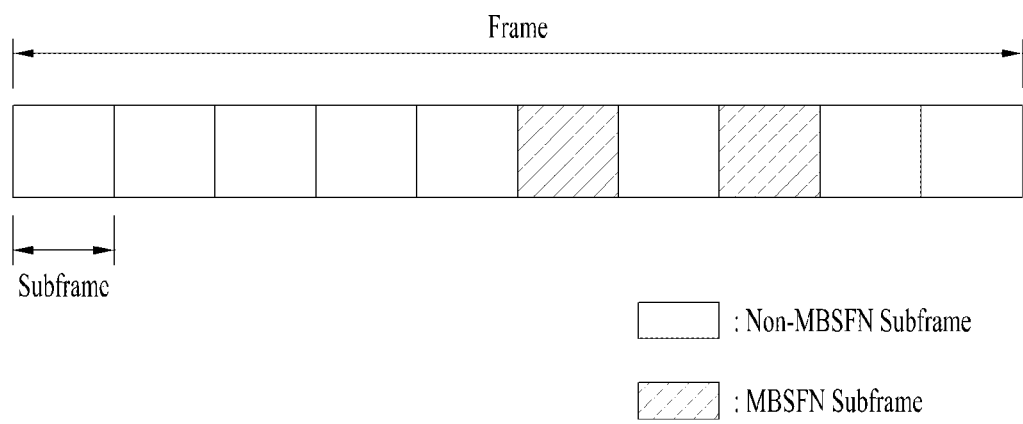
FIG. 8 is a diagram illustrating an example of the structure of a Multimedia Broadcast Single Frequency Network (MB-SFN) subframe.
Figure 8:
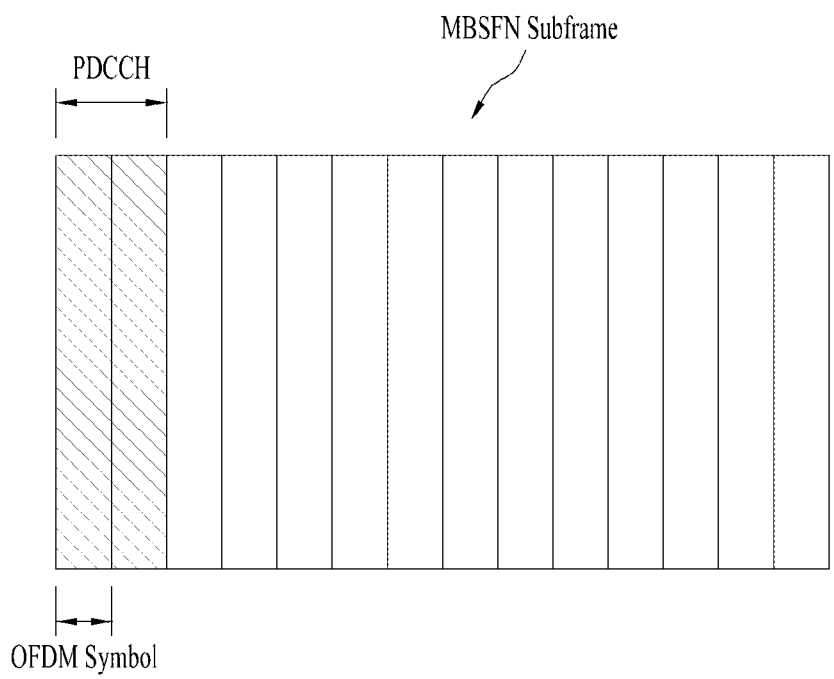

FIG. 8 is a diagram illustrating an example of the structure of a Multimedia Broadcast Single Frequency Network (MBSFN) subframe.

Referring to the upper part of FIG. 8, a single frame may include 10 subframes, which may include two types of subframes: (i) non-MBSFN subframes, which are used for normal (e.g., unicast) data transmission and reception, and (ii) MBSFN subframes, which may be used for broadcast or multicast data transmission. In some implementations, a non-MBSFN subframe and an MBSFN subframe differ in the number of OFDM symbols, the length of a Cyclic Prefix (CP), and the structure and number of Cell-specific Reference Signals (CRSs).

In some implementations, such as those compatible with LTE-Rel 8 and LTE-Rel 9, the MBSFN subframes may be used only for the purpose of transmitting broadcast or multicast data.

However, in other implementations, such as those compatible with LTE-Rel 10 or beyond, the MBSFN subframe may also be used for unicast data transmission, which is data transmission for a specific UE, in addition to the purpose of broadcast or multicast data transmission.

Referring to the lower part of FIG. 8, an MBSFN subframe is a type of subframe for transmitting a Physical Broadcast Channel (PBCH). An MBSFN subframe may be a type of subframe in which a CRS is not transmitted in a region other than a PDCCH region including the first two OFDM symbols. In this case, the PDCCH region may include one OFDM symbol. In some implementations, a UE for which data reception in the MBSFN subframe is not configured may not receive DL data in a region other than the PDCCH region included in the MBSFN subframe. MBSFN configuration information may represent information for configuring the MBSFN subframe and may be transmitted through a higher layer signal. For example, a Base Station (BS) may transmit the MBSFN configuration information through System Information Block 2 (SIB-2) transmitted on a PDSCH. The MBSFN configuration information may include information such as a bitmap indicating the MBSFN subframe, a radio frame allocation period, a radio frame allocation offset, and subframe allocation.

An example of transmitting and receiving a DL data channel according to some implementations of the present disclosure is described below.

Implementations disclosed herein enable, in some scenarios, transmitting and receiving information while achieving very low latency and very high reliability. To this end, techniques for configuring various target Quality of Service (QoS) requirements such as latency and/or reliability and efficiently providing services satisfying the target QoS requirements by differently performing an operation according to each target QoS requirement may be utilized.

The present disclosure describes implementations that, in some scenarios, enable for repeatedly transmitting DL data, by the BS to the UE, to achieve higher reliability and lower latency in a cellular communication system. Particularly, the present disclosure describes implementations for repeatedly transmitting the DL data in scenarios where repeated transmission of the DL data is scheduled so as to span multiple subframes of different types and/or different transmission modes (TMs).

Although features and/or implementations of the present disclosure may be regarded as one technique, a combination of features and/or implementations disclosed herein may also be utilized. In addition, features and implementations disclosed herein are not limited to the particular examples disclosed herein, nor are they limited to being applied to a specific system. Instead, the feature and implementations disclosed herein may be extended in the range which is easily derivable from an implementation proposed in the present disclosure by those skilled in the art and the implementations of the present disclosure are applicable to various communication systems such as LTE, LTE-A, LTE-Pro, NR, and IEEE systems.

In addition, some or all parameters of the present disclosure, some or all operations of the present disclosure, a combination of parameters and/or operations, whether a corresponding parameter and/or operation is applied, and/or whether a combination of parameters and/or operations is applied may be indicated by the BS to the UE through higher layer signaling and/or physical layer signaling, or may be predefined in a system.

Implementations of the present disclosure described in relation to different subframe types may also be applied to different Transmission Modes (TMs). For example, implementations of the present disclosure may be applied where two subframes have the same subframe type, but have different TMs.

As described herein, a Transmission Time Interval (TTI) may correspond to various TTI length units, such as a subslot/slot/subframe. A subslot and a slot may be referred to as a "short TTI." In some implementations, a short TTI may be defined as having a duration that is smaller than 1 ms of a Downlink Shared Channel (DL-SCH) and an Uplink Shared Channel (UL-SCH). In some implementations, control channels supporting the short TTI, for example, a Short PDCCH (SPDCCH) and a Short PUCCH (SPUCCH), may also be transmitted in a duration shorter than 1 ms. In this case, a slot has a duration of 0.5 ms and, therefore, may include 7 symbols. In some implementations, a subslot may include two symbols or three symbols.

In a TDD system, short TTI-based transmission may be performed in units of slots and, in an FDD system, short TTI-based transmission may be performed in units of slots and/or subslots.

Figure 9A:
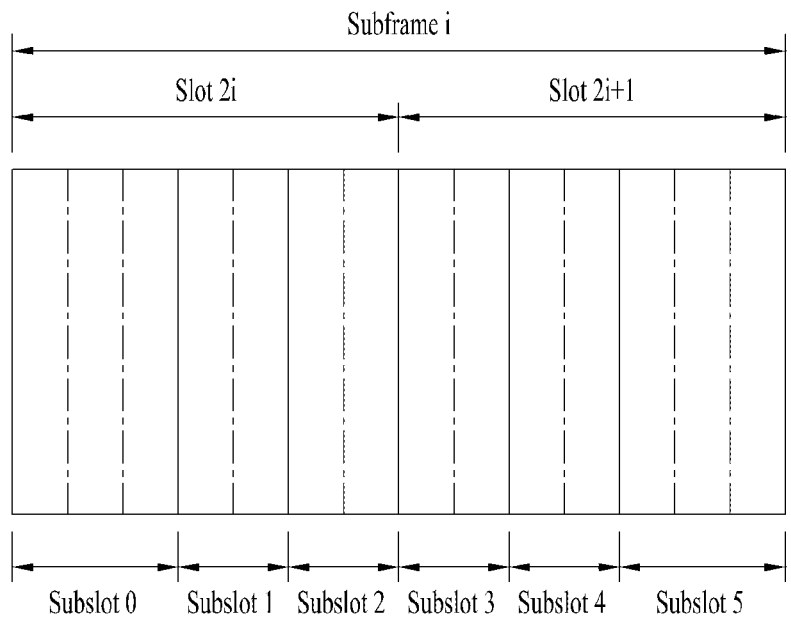
FIGS. 9A and 9B are diagrams illustrating an example of the structure of a short Transmission Time Interval (TTI)

In this case, one subframe may include 6 subslots and a pattern in which the subslots are deployed may differ according to the number of symbols used for a PDCCH. For example, if the number of symbols used for the PDCCH is 1 or 3, then each of subslot 0 and subslot 5 includes 3 symbols and each of the other subslots includes 2 symbols, as illustrated in FIG. 9A.

Figure 9B:
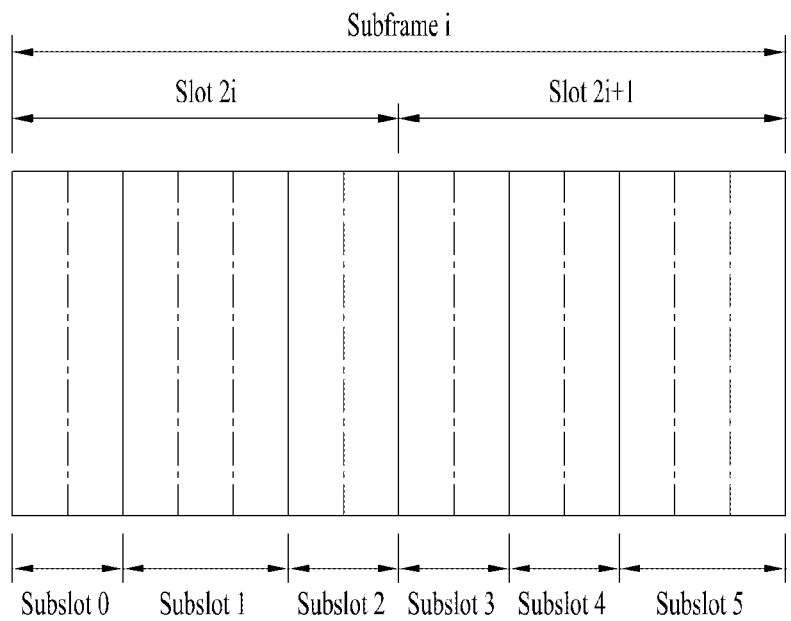

As another example, if the number of symbols used for the PDCCH is 2, then each of subslot 1 and subslot 5 includes 3 symbols and each of the other subslots includes 2 symbols, as illustrated in FIG. 9B.

In some implementations, data may be repeatedly transmitted. This may be done, for example, to increase reliability of DL transmission.

Figure 10A:
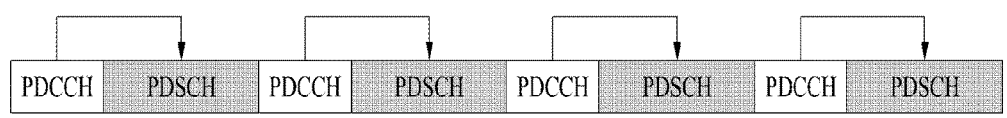
FIGS. 10A and 10B are diagrams illustrating examples of repeatedly transmitted data which is scheduled.

For example, as shown in FIG. 10A, a control channel and a data channel scheduled by the control channel may be independently transmitted in every TTI. The BS may inform the UE that data channels transmitted in a plurality of TTIs carry the same Transmission Block (TB), using a HARQ process number or a New Data Indicator (NDI) in each control channel and repeatedly transmit the same data in the plural TTIs.

Figure 10B:
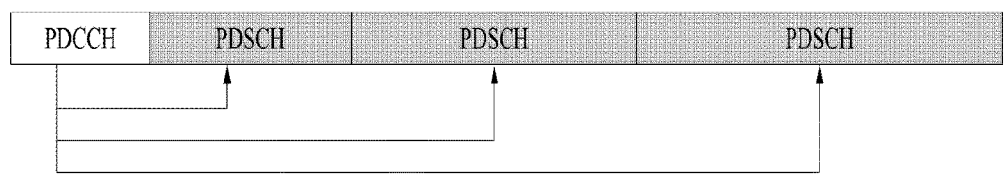

As another example, as shown in FIG. 10B, a control channel that is transmitted in a single TTI may schedule data which is repeatedly transmitted in a plurality of TTIs. That is, the control channel transmitted in a single TTI may schedule data for a plurality of TTIs. This may be done, for example, to further reduce overhead of the control channel as compared with the example in FIG. 10A.

Thus, the control channel may be transmitted in a plurality of TTIs and, in this case, the number of TTIs in which the control channel is transmitted may be fewer than the number of TTIs in which the data channel is transmitted. Information such as a Modulation and Coding Scheme (MCS)/Resource Allocation (RA) in Downlink Control Information (DCI) for scheduling data which is repeatedly transmitted in a plurality of TTIs may be equally applied to all TTIs in which data is repeatedly transmitted. The DCI may include information about the number of repeated transmissions of data.

In some implementations, such as those compatible with an LTE Short TTI (sTTI) system, a different TM may be configured per subframe type. Specifically, different TMs may be configured for an MBSFN subframe and for a non-MBSFN subframe. For example, TM 4 may be configured for a non-MBSFN subframe and TM 9 may be configured for an MBSFN subframe. The TTIs (i.e., sTTIs) that are included in a subframe, which is configured as a specific subframe type, may operate based on a TM configured in correspondence to the specific subframe type.

If data which is repeatedly transmitted in a plurality of TTIs including a specific TTI is scheduled through DCI transmitted in the specific TTI as described above, then information about the number k of repeated transmissions of the data may be transmitted, for example through the DCI.

If decoding of the DCI is successful, then the UE may be configured not to attempt to decode the DCI in the other (k−1) continuous (or discontinuous) TTIs in which the data is repeatedly transmitted, or the UE may be configured to discard the DCI even if the UE has detected the DCI by attempting to decoding the DCI. The DCI that the UE does not decode or discards may be DCI related to Cell-RNTI (C-RNTI)-based data scheduling or DCI related to DL data scheduling. The DCI that the UE has successfully decoded may also be the DCI related to C-RNTI-based data scheduling or the DCI related to DL data scheduling.

In some scenarios, repeated transmissions of data may be scheduled by successfully decoded DCI so as to span over multiple subframes of different types (e.g., an MBSFN subframe and a non-MBSFN subframe) and/or different TMs. In such scenarios, a problem may arise in that a Reference Signal (RS) for data decoding in one subframe (in which the successfully decoded DCI is transmitted) may not be present in another subframe that includes a part or all of subsequent repeated transmission of that data. Compounding this problem, the two subframes may have different types and/or different TMs. In such scenarios, the UE may fail to perform decoding for one or more of the repeated transmissions of data in subsequent subframes having different types and/or different TMs.

As an example, consider a scenario where one subframe (in which the successfully decoded DCI is transmitted) is a non-MBSFN subframe, and TM 4 is configured in that non-MBSFN subframe, with a Common Reference Signal (CRS) being used. In such scenarios, if another subframe (in which a part or all of subsequent repeated transmission of data is included) is an MBSFN subframe and TM 9 is configured in that other MBSFN subframe, then the CRS is not present in that other MBSFN subframe. In such scenarios, that the UE may fail to decode the repeatedly transmitted data in the other MBSFN subframe, which lacks the CRS.

Generally, applied references signals (RSs) may differ according to different subframe types and/or different TMs configured in subframes having different subframe types. If DCI formats for scheduling different TMs configured in subframes of different types differ, then field configurations and/or field information of the DCI formats are differently configured.

Accordingly, if data which is repeatedly transmitted in TTIs (including an initial TTI and at least one subsequent TTI) is scheduled through DCI transmitted in the initial TTI, and if the DCI is successfully decoded (so that DCI is not decoded in the subsequent TTIs or is discarded), then the UE may fail to acquire information (such as precoding/rank information) that should be provided for a TM configured according to a changed subframe type (even though data is repeatedly transmitted over subframe types of which are differently configured). Accordingly, problems may arise in which the UE cannot normally decode one or more (or parts of) repeated transmission for a specific TB that is transmitted in a subsequent subframe.

Implementations of the present disclosure may, in some scenarios, address such problems.

Prior to description of the implementations, an example of an operation of a UE and a BS according to implementations of the present disclosure will now be described with reference to FIGS. 11 to 13.

Figure 11:
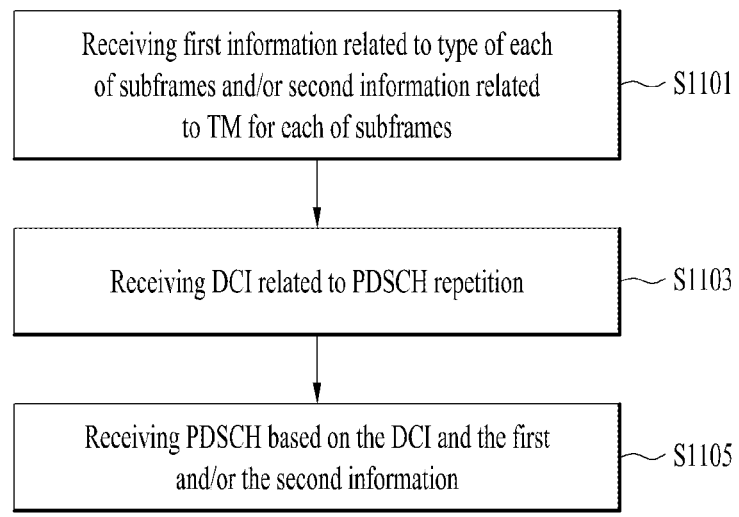
FIGS. 11 to 13 are diagrams illustrating examples of operations of a UE, a BS, and a network according to some implementations of the present disclosure.

FIG. 11 is a diagram illustrating an example of operations of a UE according to implementations of the present disclosure. Referring to FIG. 11, the UE may receive (i) first information for configuring a type of each of subframes and (ii) second information for configuring a TM applied to each of the subframes (S1101). The first information and the second information may be received through higher layer signaling and/or physical layer signaling. Then, the UE decodes DCI related to repeated transmission of data in a specific TTI, specifically, in an sTTI (S1103). The DCI may include information about the number of repeated transmissions of the data and information about an MCS, RA, precoding, and rank, for a type and a TM configured in a subframe in which the DCI is included.

Upon detecting the DCI, the UE may receive the repeatedly transmitted data over subframes configured as different types and/or different TMs, based on the information included in the DCI, the first information, and the second information (S1105).

A detailed operation method of receiving the repeatedly transmitted data by the UE based on the detected DCI, the first information, and the second information may conform to implementations which will be described further below.

Figure 12:
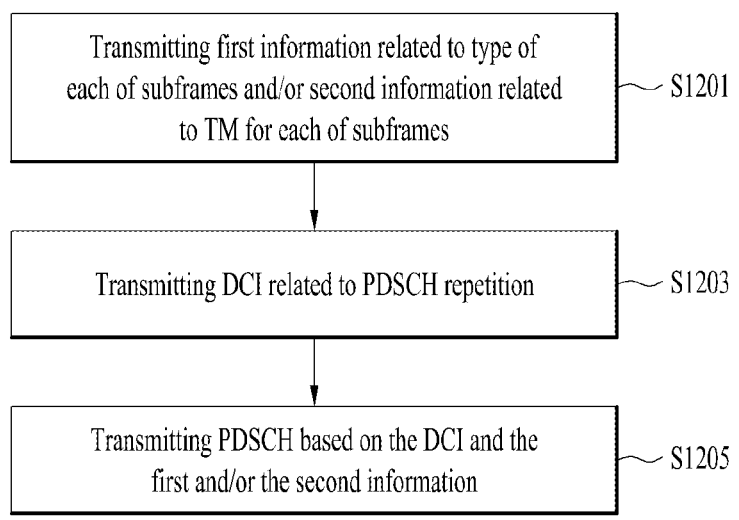

FIG. 12 illustrates an example of operations of a BS according to some implementations of the present disclosure. Referring to FIG. 12, the BS may transmit (i) first information for configuring a type of each of subframes, and (ii) second information for configuring a TM applied to each of the subframes (S1201). The first information and the second information may be transmitted through higher layer signaling and/or physical layer signaling. Then, the BS may transmit DCI related to repeated transmission of data in a specific TTI, specifically, in an sTTI (S1203). The DCI may include information about the number of repeated transmissions of the data and information about an MCS, RA, precoding, and rank, for a type and a TM configured in a subframe in which the DCI is included.

Upon transmitting the DCI, the BS may repeatedly transmit the data over subframes configured as different types and/or different TMs, based on the information included in the DCI, the first information, and the second information (S1205).

Further examples are provided below of a BS repeatedly transmitting the data over subframes configured as different types and/or different TMs based on the transmitted DCI, the first information, and the second information.

Figure 13:
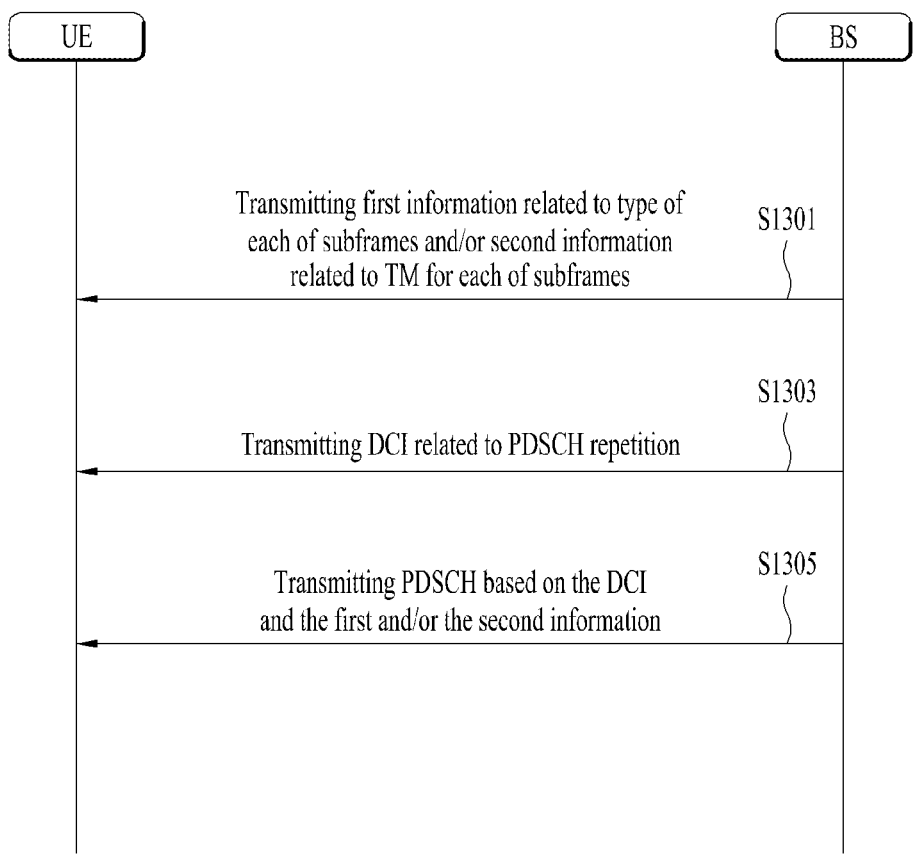

FIG. 13 illustrates an example of operations of a UE and a BS in terms of an entire network. As shown in this example, the BS may transmit (i) first information for configuring a type of each of subframes and (ii) second information for configuring a TM applied to each of the subframes to the UE through higher layer signaling and/or physical layer signaling (S1301). Next, the BS may transmit DCI related to repeated transmission of data in a specific TTI, specifically, in a specific sTTI, to the UE (S1303). The DCI may include information about the number of repeated transmissions of the data and information about an MCS, RA, precoding, and rank, for a type and a TM configured in a subframe in which the DCI is included.

Upon transmitting the DCI, the BS may repeatedly transmit data over subframes configured as different types and/or different TMs, based on the information included in the DCI, the first information, and the second information and the UE may receive the repeatedly transmitted data based on the DCI, the first information, and the second information (S1305).

Further examples are provided below of a BS repeatedly transmitting data over subframes configured as different types and/or different TMs, based on the DCI, the first information, and the second information, and a UE receiving the repeatedly transmitted data.

Next, some examples of implementations for performing the operations of the UE and the BS will be described.

Figure 14:
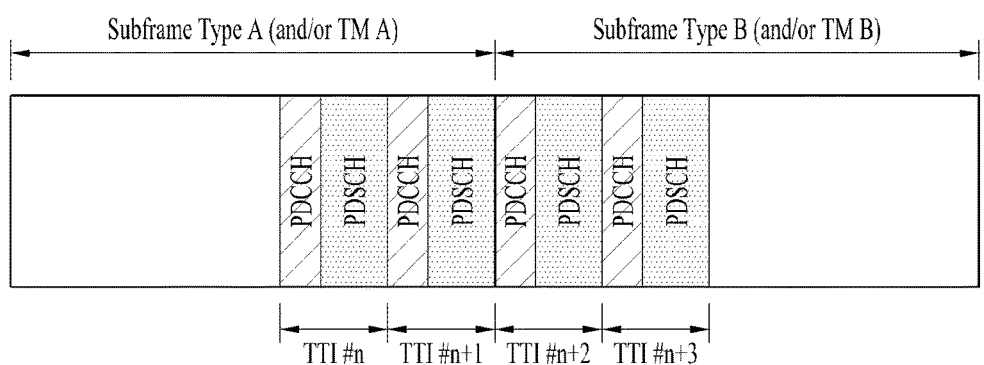
FIG. 14 is a diagram illustrating an example of data which is repeatedly transmitted in subframes configured as different transmission modes (TMs) and/or types, according to some implementations of the present disclosure.

FIG. 14 is a diagram illustrating an example of data which is repeatedly transmitted in subframes configured as different transmission modes (TMs) and/or types, according to some implementations of the present disclosure.

However, the example described below with reference to FIG. 14 is merely to aid in understanding the present disclosure, and implementations of the present disclosure are not limited to the example in FIG. 14. The present disclosure may also be applied to other numbers of repeated transmissions, other types of subframes in which repeatedly transmitted TTIs (or repeatedly transmitted data) are included, and/or other configurations of TMs.

In the example of FIG. 14, the UE decodes, in TTI #n, DCI indicating the number, 4, of repeated transmissions. Furthermore, TTI #n and TTI #n+1 (in which data is repeatedly transmitted) are included in a subframe of type A (and/or TM A). Furthermore, TTI #n+2 and TTI #n+3 (in which data is repeatedly transmitted) are included in a subframe of type B (and/or TM B). More specifically, the subframe of type A may be an MBSFN subframe and TM A may be TM 9. In addition, the subframe of type B may be a non-MBSFN subframe and TM B may be TM 4.

In this example, the BS additionally transmits DCI for a TM configured in a subframe of type B in TTI #n+2 and the UE may attempt to decode the additionally transmitted DCI. This may be an exception to the case in which, if the UE succeeds in decoding DCI transmitted in a specific TTI for scheduling the repeatedly transmitted data, the UE does not attempt to decode DCI transmitted in a subsequent TTI (e.g., DCI related to C-RNTI-based data scheduling) or discards the DCI even when the UE detects the DCI by attempting to perform decoding.

Herein, scheduling information such as precoding/rank, included in the DCI decoded in TTI #n+2, may be equally applied to data transmission in TTI #n+2 and TTI #n+3. More generally, if plural TTIs to which repeated transmissions of the data (scheduled by successfully decoded DCI) belong are included in different subframes, and if TMs of the different subframes are changed due to change in types of the subframes, then the UE may additionally detect decoding of the DCI in a TTI included in a subsequent subframe having a changed TM and/or type. The UE may then attempt to decode the repeatedly transmitted data in those subsequent TTIs (including a TTI in which the DCI included in the subframe having the changed TM and/or type is detected) according to an operation indicated by the DCI. In some scenarios, a TTI in which the UE attempts to decode the DCI in a subsequent subframe may be the first TTI of subsequent subframes.

In scenarios of combinations of partial TMs, the UE may not decode the DCI in a TTI included in a subsequent subframe even if a TM is changed according to a corresponding combination while data is repeatedly transmitted. For example, the UE may omit an operation of decoding the DCI in the first TTI of the subsequent subframe.

Whether this operation is performed may be predefined in a system or may be indicated to the UE by the BS through higher layer signaling and/or physical layer signaling.

The above operation may be performed such that two DCIs are transmitted in two subframes, respectively, where the two subframes are configured with different TMs and/or different types in a duration in which the data is repeatedly transmitted. In this case, the BS may indicate, to the UE, that one or more TTIs corresponding to the number of repeated transmissions of data indicated by the first DCI may include one or more TTIs corresponding to the number of repeated transmissions of data indicated by the second DCI.

For example, referring back to the example of FIG. 14, if DCI transmitted in TTI #n indicates the number, k, of repeated transmissions of data, then the data is repeatedly transmitted in TTI #n to TTI #n+(k−1). If TTIs starting from TTI #n+p (where p<k−1) are included in a subframe configured as a different TM and/or a type different from a TM and/or a type of an initial TTI, then DCI may be transmitted in TTI #n+p and the UE may operate to decode the DCI.

In this case, the number of repeated transmissions of data indicated by the DCI transmitted in TTI #n+p may be a value smaller than or equal to k−p. Alternatively, under the assumption that the number of repeated transmissions of data indicated by the DCI transmitted in TTI #n+p is k−p, a specific value which is predefined or is indicated by the BS to the UE through higher layer signaling and/or physical layer signaling may be transmitted in a field for indicating the number of repeated transmissions of data in the DCI and the specific value may be used as a virtual Cyclic Redundancy Check (CRC).

In addition, the BS may indicate the number of repeated transmissions of data in consideration of a boundary between subframes at which a TM and/or a subframe type is changed or a boundary between subframes having the same TM and/or subframe type. In this case, whether data which is repeatedly transmitted over the boundary between subframes at which a TM and/or a subframe type is changed or the boundary between subframes having the same TM and/or subframe type is combined may be predefined in a system or may be indicated by the BS to the UE through higher layer signaling and/or physical layer signaling.

For example, if it is necessary to indicate 4 repeated transmissions of data at a timing of TTI #n and a subframe type and/or a TM is changed starting from TTI #n+2, then the BS may indicate the number, 2, of repeated transmissions of data through DCI transmitted at a timing of TTI #n and may indicate the number, 2, of repeated transmissions of data, through the DCI transmitted at a timing of TTI #n+2, together with the same HARQ process ID and/or non-toggled NDI as a HARQ process ID and/or a non-toggled NDI of the previously transmitted DCI. If combining repeatedly transmitted data over two subframes is indicated or is predefined, then the UE may combine a total of 4 repeated transmissions of the data, twice per type and/or TM and transmit HARQ-ACK for the data based on a timing at which all of data repeatedly transmitted over a subframe boundary is received.

The BS may predefine scheduling information such as precoding/rank to be applied to repeated transmission of data in TTIs #n+2 and #n+3 of a subframe of type B in the system or signal the scheduling information to the UE through higher layer signaling and/or physical layer signaling. In this case, as opposed to the above description, additional DCI need not be transmitted in TTI #n+2. For example, if a TM and/or a subframe type is changed from a CRS-based TM and/or a non-MBSFN subframe to a DMRS-based TM and/or an MBSFN subframe, then information such as a scrambling ID, the number of layers, an antenna port, and a PDSCH rate matching and Quasi co-location Indicator (PQI) may be implemented. A default state or a configuration for the information may be predefined in the system or may be indicated by the BS to the UE through higher layer signaling and/or physical layer signaling. Alternatively, DCI received during scheduling of the latest DMRS-based TM and/or MBSFN subframe may be reused.

Similarly, if a TM and/or a subframe type is changed from the DMRS-based TM and/or the MBSFN subframe to the CRS-based TM and/or the non-MBSFN subframe, then precoding information may be implemented. Therefore, a default state for the precoding information may be predefined or may be indicated by the BS to the UE through higher layer signaling and/or physical layer signaling. In addition, information of DCI received during scheduling of the latest CRS-based TM and/or the non-MBSFN subframe may be reused.

In some implementations, repeated transmissions for a specific TB may be limitedly performed only within subframes configured as the same type or within a single subframe.

For example, referring back to the example of FIG. 14, TTIs #n, #n+1, #n+2, and #n+3 (in which repeated transmissions of data are performed) may be located only in subframes of the same type. In other words, repeated transmissions for a specific data TB may be performed over subframes having the same type, and may not be performed over subframes having different types. Alternatively, repeated transmissions for a specific TB may be performed only in a single subframe. For example, the UE may not expect that DCI transmitted in the last TTI in a subframe will indicate the number of repeated transmissions of data exceeding 1.

Alternatively, the BS may configure repeated transmissions for a specific TB over a subframe boundary for the UE, and the BS may configure the same TM and/or the same type for subframes before or after the subframe boundary. In terms of the UE, if repeated data transmission is configured or indicated, then the UE may expect that respective TMs and/or types of subframes in which repeated data transmission is performed will not be differently configured and will be equally configured.

The UE may assume that a TM associated with detected DCI, i.e., that a TM related to a subframe in which the detected DCI is transmitted and/or a subframe type is applied to all TTIs in which data is repeatedly transmitted. In other words, if repeated data transmission is indicated that it is spanned in subframes, then the UE may assume that data is transmitted based on the same TM and/or the same subframe type in all TTIs corresponding to repeated data transmission. Alternatively, if repeated data transmission spans a subframe boundary at which the TM and/or the subframe type is changed (according to the number of repeated data transmissions configured by the DCI), then the repeated data transmission is performed only up to a subframe before the subframe boundary and repeated data transmission may be stopped in a subframe after the subframe boundary. In other words, if a configured duration of repeated data transmission spans the subframe boundary at which the TM and/or the subframe type is changed, then it is interpreted that data which should be transmitted in a subsequent subframe may be dropped.

In this case, even if the number of repeated transmissions remains, since the UE does not expect that data will be received in a subsequent subframe, the UE does not perform a data decoding operation in the subsequent subframe. Therefore, it is unnecessary for the UE to receive additional information for decoding the repeatedly transmitted data in a subsequent subframe having a changed TM and/or subframe type. Therefore, if the UE decodes DCI for repeated transmission once, then an exceptional operation of an operation for discarding or not decoding the other DCI need not be defined. In addition, in some scenarios, ambiguity may be avoided in regards to decoding the repeatedly transmitted data in the subsequent subframe based on DCI received in a previous subframe.

In some implementations, if the number of repeated data transmissions is configured for the UE through DCI, then the number of repetitions may be counted only for TTIs included in a subframe having the same TM and/or same subframe type as a subframe to which a TTI in which the DCI is transmitted belongs. For example, if subframes are sequentially configured as a non-MBSFN subframe, an MBSFN subframe, and a non-MBSFN subframe, and if the number of repeated transmissions configured in the first non-MBSFN subframe exceeds the first non-MBSFN subframe, then the number of repeated data transmissions may not be counted in the MBSFN subframe and may be counted in the subsequent non-MBSFN subframe. That is, if DCI indicating repeated data transmission is detected in the first non-MBSFN subframe, then data indicated to be repeatedly transmitted may not be transmitted in the MBSFN subframe and repeated data transmission may be resumed in the subsequent non-MBSFN subframe.

The BS may indicate, to the UE, which of the above-described implementations is applied, for example through higher layer signaling and/or physical layer signaling.

As such, if TMs and/or subframe types of subframes are changed and repeated data transmission is performed over those subframes, then the BS may indicate, to the UE (through higher layer signaling and/or physical layer signaling), whether to (i) stop a repeated data transmission operation and drop the remaining repeated transmissions, or (ii) count the number of repeated transmissions only in subframes having the same subframe type and/or same TM to skip a subframe configured as a different subframe type or a different TM while data is repeatedly transmitted and resume repeated data transmission in a subsequent subframe having the same type and/or same TM.

In some implementations, if repeated transmission for a specific TB is performed and a subframe type is changed from a subframe of type A to a subframe of type B, then a combination of one or more of the above-described implementations may be limitedly applied and, when a subframe type is changed from type B to type A, an operation according to an additional rule may be performed.

For example, if a subframe type is changed from an MBSFN subframe to a non-MBSFN subframe while repeated transmission for a specific TB is performed, then an RS (e.g., DMRS) for decoding TM-based data configured in the MBSFN subframe may be transmitted as an exceptional case for repeated data transmission in the non-MBSFN. In other words, a TM related RS configured in the MBSFN subframe may be interpreted as being additionally transmitted in the non-MBSFN subframe regardless of a TM configured in the non-MBSFN subframe.

In some implementations, the above operation may not be applied to the case in which the same TM is configured in subframes (even if the types of subframes are changed) and instead may be applied to the case in which a different TM is configured per subframe or subframe type.

Alternatively, in some implementations, even if the type and/or TM of the subframe is changed while data is repeatedly transmitted, the same configuration of a type and/or TM of a front subframe may be applied while the data is repeatedly transmitted.

For example, while data is repeatedly transmitted, if a TM and/or a subframe type is changed from a DMRS-based TM and/or an MBSFN subframe to a CRS-based TM and/or a non-MBSFN subframe, then the DMRS-based TM may be maintained in a TTI in which the data is repeatedly transmitted or the DMRS-based TM may be maintained in all of the non-MBSFN subframe, as an exceptional case. As another example, while data is repeatedly transmitted, if a TM and/or a subframe type is changed from the CRS-based TM and/or the non-MBSFN subframe to the DMRS-based TM and/or the MBSFN subframe, then this may be addressed through network scheduling or a TM for repeated transmission may be semi-statically configured separately from a TM for another subframe set.

Figure 15:
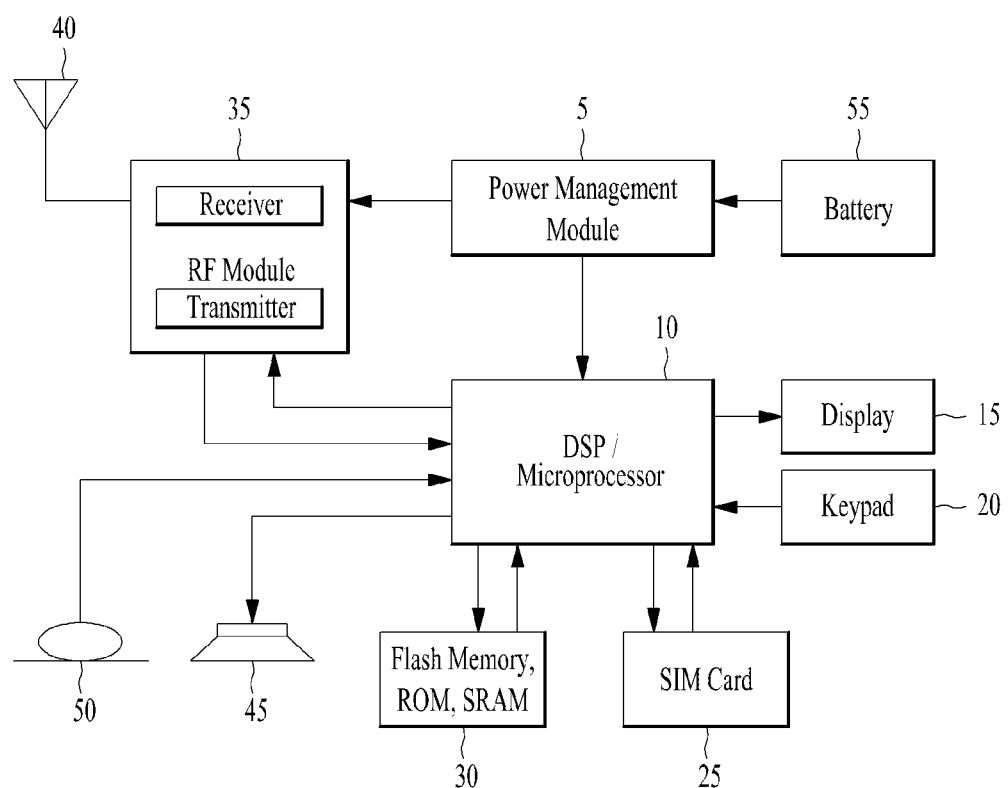
FIG. 15 is a block diagram of an example of wireless devices for implementing the present disclosure.

FIG. 15 shows an example of a radio communication apparatus according to some implementations of the present disclosure.

The wireless communication apparatus illustrated in FIG. 15 may represent a User Equipment (UE) and/or a base station (BS) according to an implementation of the present disclosure. However, the wireless communication apparatus of FIG. 15 is not necessarily limited to the UE and/or the BS according to the present disclosure, and may implement various types of apparatuses, such as a vehicle communication system or apparatus, a wearable apparatus, a laptop, etc.

In the example of FIG. 15, a UE and/or a BS according to implementations of the present disclosure includes at least one processor, such as processor 10, which may include, for example, a digital signal processor or a microprocessor. The UE and/or BS also includes a transceiver 35, a power management module 5, an antenna 40, a battery 55, a display 15, a keypad 20, at least one memory 30, a subscriber identity module (SIM) card 25, a speaker 45, and a microphone 50, and the like. The UE and/or the BS may include a single antenna or multiple antennas. The transceiver 35 may be also referred to as an RF module.

The at least one processor 10 may be configured to implement the functions, procedures and/or methods described in FIGS. 1 to 14. In at least some of the implementations described in FIGS. 1 to 14, the at least one processor 10 may implement one or more protocols, such as layers of the air interface protocol (e.g., functional layers).

The at least one memory 30 is connected to the at least one processor 10 and stores information related to the operation of the at least one processor 10. The at least one memory 30 may be internal or external to the at least one processor 10 and may be coupled to the at least one processor 10 via a variety of techniques, such as wired or wireless communication.

The user can input various types of information (for example, instruction information such as a telephone number) by various techniques such as pressing a button on the keypad 20 or activating a voice using the microphone 50. The at least one processor 10 performs appropriate functions such as receiving and/or processing information of the user and dialing a telephone number.

It is also possible to retrieve data (e.g., operational data) from the SIM card 25 or the at least one memory 30 to perform the appropriate functions. In addition, the at least one processor 10 may receive and process GPS information from the GPS chip to obtain location information of the UE and/or BS such as vehicle navigation, map service, or the like, or perform functions related to location information. In addition, the at least one processor 10 may display these various types of information and data on the display 15 for reference and convenience of the user.

The transceiver 35 is coupled to the at least one processor 10 to transmit and/or receive radio signals, such as RF signals. At this time, the at least one processor 10 may control the transceiver 35 to initiate communications and transmit wireless signals including various types of information or data, such as voice communication data. The transceiver 35 may comprise a receiver for receiving the radio signal and a transmitter for transmitting. The antenna 40 facilitates the transmission and reception of radio signals. In some implementations, upon receipt of a radio signal, the transceiver 35 may forward and convert the signal to a baseband frequency for processing by the at least one processor 10. The processed signals may be processed according to various techniques, such as being converted into audible or readable information, and such signals may be output via the speaker 45.

In some implementations, a sensor may also be coupled to the at least one processor 10. The sensor may include one or more sensing devices configured to detect various types of information, including velocity, acceleration, light, vibration, and the like. The at least one processor 10 receives and processes the sensor information obtained from the sensor such as proximity, position, image, and the like, thereby performing various functions such as collision avoidance and autonomous travel.

Meanwhile, various components such as a camera, a USB port, and the like may be further included in the UE and/or the BS. For example, a camera may be further connected to the at least one processor 10, which may be used for a variety of services such as autonomous navigation, vehicle safety services, and the like.

FIG. 15 merely illustrates one example of an apparatuses constituting the UE and/or the BS, and the present disclosure is not limited thereto. For example, some components, such as keypad 20, Global Positioning System (GPS) chip, sensor, speaker 45 and/or microphone 50 may be excluded for UE and/or BS implementations in some implementations.

Specifically, in order to implement implementations of the present disclosure, an operation when the radio communication apparatus illustrated in FIG. 15 is a UE according to an implementation of the present disclosure will now be described. When the radio communication apparatus is the UE according to an implementation of the present disclosure, the processor 10 may control the transceiver 35 to receive first information for configuring types of subframes and second information for configuring TMs applied to the subframes through higher layer signaling and/or physical layer signaling. Next, the processor 10 decodes DCI related to repeated transmission of data in a specific TTI, specifically, in an sTTI. The DCI may include information about the number of repeated transmissions of the data and information about an MCS, RA, precoding, and rank, for a type and a TM configured in a subframe in which the DCI is included.

Upon detecting the DCI, the processor 10 may control the transceiver 35 to receive repeatedly transmitted data over subframes configured as different types and/or different TMs, based on the information included in the DCI, the first information, and the second information.

A detailed operation method of receiving the repeatedly transmitted data over subframes by the processor based on the detected DCI, the first information, and the second information may conform to the implementations described with reference to FIGS. 1 to 14.

In order to implement implementations of the present disclosure, when the radio communication apparatus illustrated in FIG. 15 is the BS according to an implementation of the present disclosure, the processor 10 may control the transceiver 35 to transmit first information for configuring types of subframes and second information for configuring TMs applied to the subframes through higher layer signaling and/or physical layer signaling. Next, the processor 10 control the transceiver 35 to transmit DCI related to repeated transmission of data in a specific TTI, specifically, in an sTTI. The DCI may include information about the number of repeated transmissions of the data and information about an MCS, RA, precoding, and rank, for a type and a TM configured in a subframe in which the DCI is included.

The processor 10 for control transmission of the DCI may control the transceiver 35 to transmit repeatedly transmitted data in subframes configured as different types and/or different TMs, based on the information included in the DCI, the first information, and the second information.

A detailed operation method of transmitting the repeatedly transmitted data by the BS in subframes configured as different types and different TMs based on the transmitted DCI, the first information, and the second information may conform to the implementations described with reference to FIGS. 1 to 14.

The implementations described above are those in which the elements and features of the present disclosure are combined in a predetermined form. Each component or feature shall be considered optional unless otherwise expressly stated. Each component or feature may be implemented in a form that is not combined with other components or features. It is also possible to construct implementations of the present disclosure by combining some of the elements and/or features. The order of the operations described in the implementations of the present disclosure may be changed. Some configurations or features of certain implementations may be included in other implementations, or may be replaced with corresponding configurations or features of other implementations. It is clear that the claims that are not expressly cited in the claims may be combined to form an implementation or be included in a new claim by an amendment after the application.

The specific operation described herein as being performed by the BS may be performed by its upper node, in some cases. That is, it is apparent that various operations performed for communication with a UE in a network including a plurality of network nodes including a BS can be performed by the BS or by a network node other than the BS. A BS may be replaced by terms such as a fixed station, a Node B, an eNode B (eNB), an access point, and the like.

Implementations according to the present disclosure may be implemented by various means, for example, hardware, firmware, software or a combination thereof. In the case of hardware implementation, an implementation of the present disclosure may include one or more application specific integrated circuits (ASICs), digital signal processors (DSPs), digital signal processing devices (DSPDs), programmable logic devices (PLDs) field programmable gate arrays, processors, controllers, microcontrollers, microprocessors, and the like.

In the case of an implementation by firmware or software, an implementation of the present disclosure may be implemented in the form of a module, a procedure, a function, or the like for performing the functions or operations described above. The software code can be stored in a memory unit and driven by the processor. The memory unit may be located inside or outside the processor, and may exchange data with the processor by various well-known means.

While the above-described method of transmitting and receiving a DL data channel and the apparatus therefor have been described focusing upon an example applied to the 3GPP LTE system, the present disclosure is applicable to various wireless communication systems in addition to the 3GPP LTE system.

According to the present disclosure, data which is repeatedly transmitted in subframes configured as different subframe types and/or different TMs can be efficiently transmitted and received It will be appreciated by persons skilled in the art that the effects that can be achieved with the present disclosure are not limited to what has been particularly described hereinabove and other advantages of the present disclosure will be more clearly understood from the above detailed description taken in conjunction with the accompanying drawings.

It will be apparent to those skilled in the art that the present disclosure may be embodied in other specific forms without departing from the spirit of the disclosure. Accordingly, the above description should not be construed in a limiting sense in all respects and should be considered illustrative. The scope of the present disclosure should be determined by rational interpretation of the appended claims, and all changes within the scope of equivalents of the present disclosure are included in the scope of the present disclosure.

What is claimed is:

1. A method of receiving Downlink (DL) data by a User Equipment (UE) in a wireless communication system, the method comprising:
   receiving information related to a number of repetitions of the DL data, wherein the DL data is repeatedly transmitted over a plurality of transmission time intervals (TTIs); and
   receiving the DL data based on the number of repetitions of the DL data,
   wherein, based on a Transmission Mode (TM) for a first subframe, which includes a first TTI of the plurality of TTIs, being different from a TM for a second subframe, the DL data is not received in at least one second TTI included in the second subframe, the second TTI following the first TTI.

2. The method of claim 1, wherein the first subframe and the second subframe are consecutive in time.

3. The method of claim 1, wherein any one of the first subframe and the second subframe is a Multicast Broadcast Single Frequency Network (MBSFN) subframe, and
   wherein the other one of the first subframe and the second subframe is a non-MBSFN subframe.

4. The method of claim 1, wherein a Common Reference Signal (CRS)-based TM is configured for any one of the first subframe and the second subframe, and
   wherein a Demodulation Reference Signal (DMRS)-based TM is configured for the other one of the first subframe and the second subframe.

5. The method of claim 1, wherein the information related to the number of repetitions of the DL data is included in Cell-Radio Network Temporary Identifier (C-RNTI)-based Downlink Control Information (DCI).

6. The method of claim 1, wherein the first TTI and the at least one second TTI are short TTIs.

7. An apparatus comprising:
   at least one processor; and
   at least one computer memory operably connectable to the at least one processor and storing instructions that, when executed by the at least one processor, perform operations comprising:
   receiving information related to a number of repetitions of downlink (DL) data , wherein the DL data is repeatedly transmitted over a plurality of transmission time intervals (TTIs), and
   receiving the DL data based on the number of repetitions of the DL data,
   wherein, based on a Transmission Mode (TM) for a first subframe, which includes a first TTI of the plurality of TTIs, being different from a TM for a second subframe, the DL data is not received in at least one second TTI included in the second subframe, the second TTI following the first TTI.

8. The apparatus of claim 7, wherein the first subframe and the second subframe are consecutive in time.

9. The apparatus of claim 7, wherein any one of the first subframe and the second subframe is a Multicast Broadcast Single Frequency Network (MBSFN) subframe, and
   wherein the other one of the first subframe and the second subframe is a non-MBSFN subframe.

10. The apparatus of claim 7, wherein a Common Reference Signal (CRS)-based TM is configured for any one of the first subframe and the second subframe, and
    wherein a Demodulation Reference Signal (DMRS)-based TM is configured for the other one of the first subframe and the second subframe.

11. The apparatus of claim 7, wherein the information related to the number of repetitions of the DL data is included in Cell-Radio Network Temporary Identifier (C-RNTI)-based Downlink Control Information (DCI).

12. The apparatus of claim 7, wherein the at least one first TTI and the at least one second TTI are short TTIs.

13. The apparatus of claim 7, wherein the apparatus comprises a User Equipment (UE) configured to receive the DL data in a wireless communication system, the UE comprising at least one transceiver, the at least one processor, and the at least one computer memory, wherein receiving the information related to the number of repetitions of the DL data comprises receiving, through the at least one transceiver, the information related to the number of repetitions of the DL data, and wherein receiving the DL data comprises receiving, through the at least one transceiver, the DL data based on the number of repetitions of the DL data.

14. A method of transmitting Downlink (DL) data by a Base Station (BS) in a wireless communication system, the method comprising:

transmitting information related to a number of repetitions of the DL data, wherein the DL data is repeatedly transmitted over a plurality of transmission time intervals (TTIs); and transmitting the DL data based on the number of repetitions of the DL data, wherein, based on a Transmission Mode (TM) for a first subframe, which includes a first TTI of the plurality of TTIs, being different from a TM for a second subframe, the DL data is not transmitted in the at least one second TTI included in the second subframe, the second TTI following the first TTI.

15. A Base Station (BS) configured to transmit Downlink (DL) data in a wireless communication system, the BS comprising:

at least one transceiver;

at least one processor; and at least one computer memory operably connectable to the at least one processor and storing instructions that, when executed by the at least one processor, perform operations comprising:

transmitting, through the at least one transceiver, information related to a number of repetitions of the DL data, wherein the DL data is repeatedly transmitted over a plurality of transmission time intervals (TTIs); and transmitting, through the at least one transceiver, the DL data based on the number of repetitions of the DL data, wherein, based on a Transmission Mode (TM) for a first subframe, which includes a first TTI of the plurality of TTIs, being different from a TM for a second subframe, the DL data is not transmitted in the at least one second TTI included in the second subframe, the second TTI following the first TTI.

* * * * *